United States Patent
Ali et al.

(10) Patent No.: US 10,447,639 B2
(45) Date of Patent: Oct. 15, 2019

(54) MODIFICATION OF DELIVERED EMAIL CONTENT

(71) Applicant: MICROSOFT TECHNOLOGY LICENSING, LLC, Redmond, WA (US)

(72) Inventors: Zohaib Ali, Redmond, WA (US); Yamin Wang, Redmond, WA (US); Elena Catrinescu, Woodinville, WA (US); Joseph Marcus, Redmond, WA (US); Michael Brickman, Redmond, WA (US); Hayley Steplyk, Cambridge, MA (US); Eduardo Melo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 349 days.

(21) Appl. No.: 14/873,225

(22) Filed: Oct. 2, 2015

(65) Prior Publication Data
US 2017/0099246 A1    Apr. 6, 2017

(51) Int. Cl.
| G06F 15/16 | (2006.01) |
| H04L 12/58 | (2006.01) |
| H04L 29/08 | (2006.01) |

(52) U.S. Cl.
CPC .......... *H04L 51/22* (2013.01); *H04L 51/063* (2013.01); *H04L 51/08* (2013.01); *H04L 51/24* (2013.01); *H04L 51/36* (2013.01); *H04L 67/02* (2013.01); *H04L 67/06* (2013.01); *H04L 67/1097* (2013.01); *H04L 51/10* (2013.01)

(58) Field of Classification Search
CPC .......... H04L 51/22; H04L 51/24; H04L 51/36
USPC ................................................ 709/206, 203
See application file for complete search history.

(56) References Cited

U.S. PATENT DOCUMENTS

| 7,624,146 B1 | 11/2009 | Brogne et al. |
| 8,862,673 B2 | 10/2014 | Shkolnikov et al. |
| 8,892,660 B2 | 11/2014 | Chen et al. |
| 9,614,796 B2 * | 4/2017 | Aleksandrov ........... H04L 51/08 |
| 2004/0034688 A1 | 2/2004 | Dunn |

(Continued)

FOREIGN PATENT DOCUMENTS

| CN | 102576434 A | 7/2012 |
| CN | 104219136 A | 12/2014 |

(Continued)

OTHER PUBLICATIONS

Elgan, Mike., "Google+ lets you control email after you've sent it!", Published on: Jul. 2, 2012 Available at: https://plus.google.com/+MikeElgan/posts/eVr1Vq5CCPf.

(Continued)

*Primary Examiner* — Duyen M Doan
(74) *Attorney, Agent, or Firm* — Michael Best & Friedrich LLP

(57) ABSTRACT

Various parts of email content or entire emails may be recalled or modified after delivery through the use of links to cloud-storage, where the various parts of the email content may be stored. Different notification and modification methods may be employed to modify delivered content even after it is rendered for a recipient. While recipients may have a latest version of the email content, senders may be enabled to see a version history of changes in delivered email content.

14 Claims, 8 Drawing Sheets

(56) References Cited

U.S. PATENT DOCUMENTS

| | | | |
|---|---|---|---|
| 2004/0064733 A1 | 4/2004 | Gong | |
| 2005/0267937 A1* | 12/2005 | Daniels | G06Q 10/107 709/206 |
| 2006/0168346 A1* | 7/2006 | Chen | G06F 17/2211 709/246 |
| 2006/0230114 A1* | 10/2006 | Auhagen | G06Q 10/107 709/206 |
| 2007/0016613 A1 | 1/2007 | Foresti et al. | |
| 2007/0112919 A1* | 5/2007 | Lyle | G06Q 10/107 709/206 |
| 2007/0244977 A1 | 10/2007 | Atkins | |
| 2010/0036917 A1* | 2/2010 | McCaffrey | G06Q 10/107 709/206 |
| 2011/0047222 A1* | 2/2011 | Farrell | G06Q 10/00 709/206 |
| 2012/0011196 A1* | 1/2012 | Green | G06Q 10/107 709/203 |
| 2013/0117380 A1* | 5/2013 | Pomazanov | G06Q 10/107 709/206 |
| 2013/0219296 A1* | 8/2013 | Thazhmon | G06Q 10/107 715/752 |
| 2013/0290435 A1* | 10/2013 | Martin | H04L 51/28 709/206 |
| 2015/0180845 A1 | 6/2015 | Uomini | |
| 2015/0271117 A1 | 9/2015 | Massand | |
| 2015/0326517 A1* | 11/2015 | Block | H04L 29/06 726/7 |

FOREIGN PATENT DOCUMENTS

| | | |
|---|---|---|
| EP | 1146700 A2 | 10/2001 |
| JP | H7131480 A | 5/1995 |
| WO | 2003034304 A1 | 4/2003 |
| WO | 2013071144 A1 | 5/2013 |

OTHER PUBLICATIONS

"How to undo, delete or edit sent mail in Gmail", Retrieved on: Aug. 18, 2015 Available at: http://testingfreak.com/undo-delete-edit-sent-mail-gmail/.

"International Search Report and Written Opinion Issued in PCT Application No. PCT/US2016/053647", dated Jan. 4, 2017, 12 Pages.

"International Preliminary Report on Patentability Issued in PCT Application No. PCT/US2016/053647", dated Sep. 27, 2017, 7 Pages.

* cited by examiner

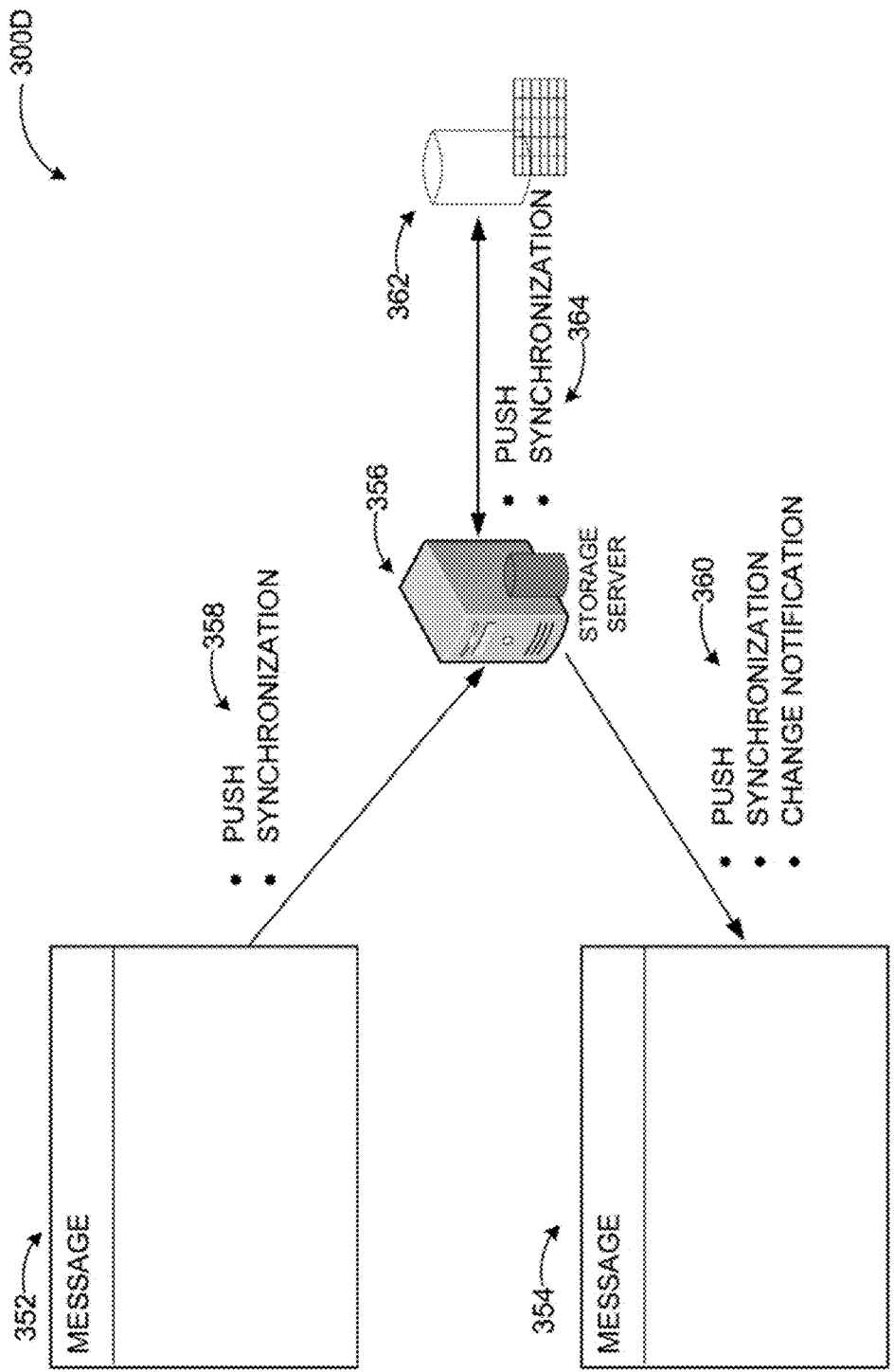

US 10,447,639 B2

MODIFICATION OF DELIVERED EMAIL CONTENT

BACKGROUND

Conventional email systems are static from a delivery perspective. That is once an email is delivered to its recipient(s), it is difficult or impossible to take it back or change any part of it. Some systems provide a recall mechanism, but typically that works only if the recipient opens the recall email first. Furthermore, the recall mechanism is limited to taking back an entire sent email, not portions of it or making, changes to the delivered email.

SUMMARY

This summary is provided to introduce a selection of concepts in a simplified form that are further described below in the Detailed Description. This summary is not intended to exclusively identity key features or essential features of the claimed subject matter, nor is it intended as an aid in determining the scope of the claimed subject matter.

Embodiments are directed to modification of sent email content. In some examples, an email may be received from a sender with a first content and a second content, and the first content and the second content stored at a storage server. The first content and the second content may be replaced in the email with a first link and a second link, and the email may be provided to a recipient with the first link and the second link, where the first content and the second content are delivered automatically upon opening of the email by the recipient. Upon receiving an update to one of the first content and the second content from the sender, the one of the first content and the second content may be updated at the storage server such that the updated one of the first content and the second content is rendered to the recipient.

These and other features and advantages will be apparent from a reading of the following detailed description and as review of the associated drawings. It is to be understood that both the foregoing general description and the following detailed description are explanatory and do not restrict aspects as claimed.

BRIEF DESCRIPTION OF THE DRAWINGS

FIG. 3A through 3D illustrate example sender and recipient emails with unsend actions and a conceptual diagram of how modifications can be performed in different scenarios;

DETAILED DESCRIPTION

Figure 1:
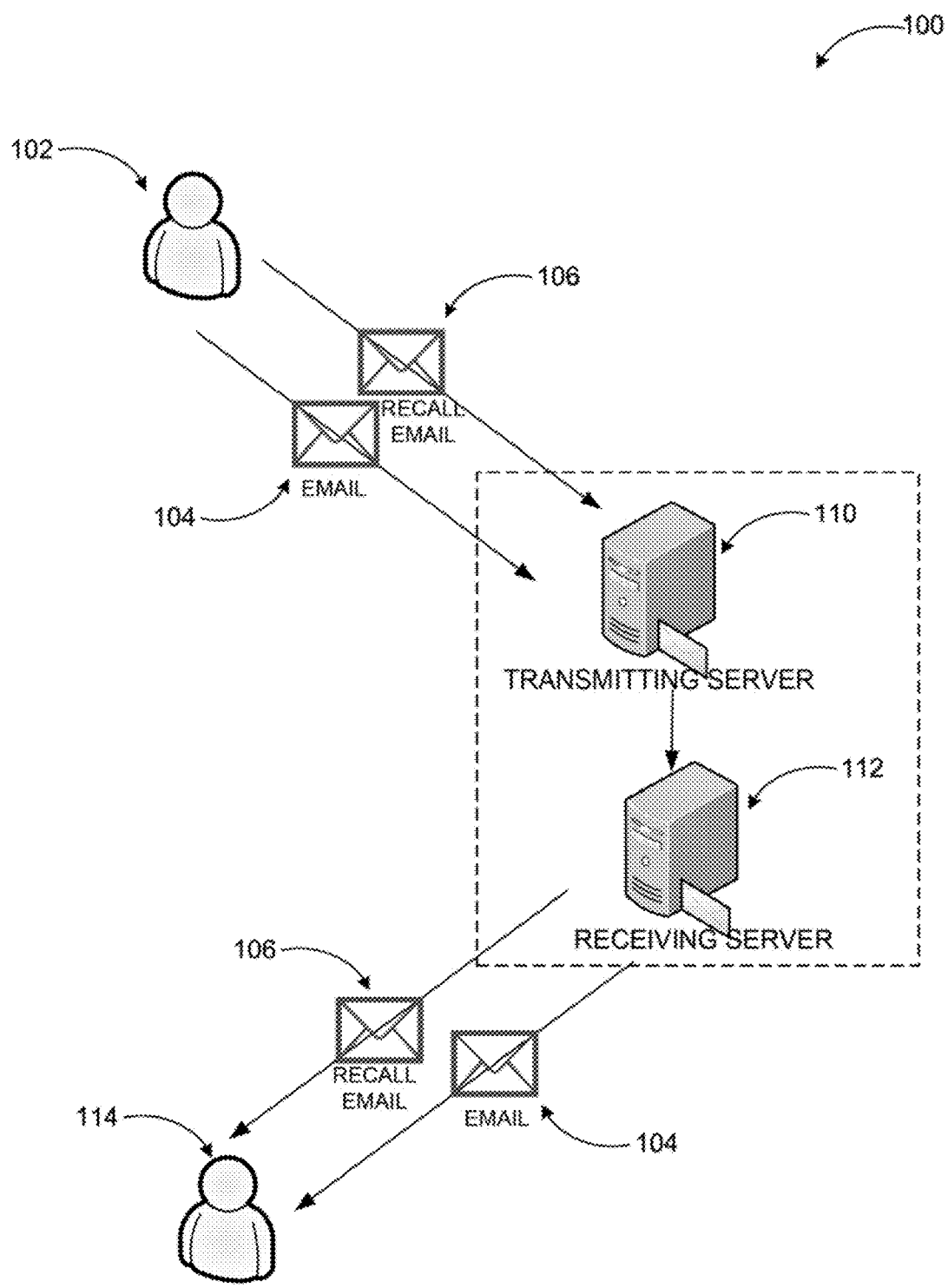
FIG. 1 includes an example flow of an email followed by a recall email to illustrate a conventional mechanism of taking back a sent email.

As briefly described above, various parts of email content or entire emails may be recalled or modified after delivery through the use oil inks to cloud-storage, where the various parts of the email content may be stored. Different notification and modification methods may be employed to modify delivered content even after it is rendered for a recipient. While recipients may have a latest version of the email content, senders may be enabled to see a version history of chances in delivered email content.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other compiler system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and, encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing communication services including emails and similar communications with embedded or attached content. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

While example implementations are described using emails herein, embodiments are not limited to emails. Modification of delivered communication content may be implemented in other communication types such as instant messages, data sharing, application sharing, online conferencing, and similar communications, where content or objects may be exchanged with the communication.

Content as used herein refers to textual data, images, graphics, video or audio content, or similar data that may be included with a communication such as an email, where the content may be embedded into or attached as a separate entity to the communication, inserted into a body of the communication, or provided along with the communication as a link to the content.

The technical advantages of providing modification of delivered content in emails or similar communication may include increased efficiency in network usage (reduced communication traffic), reduced data storage demand (reduction of delivered content), improved user efficiency (availability of changes to content even after delivery), and improved user interaction with user interfaces.

Embodiments address a need that arises from very large scale of operations created by networked computing and cloud based services that cannot be managed by humans. The actions/operations described herein are not a mere use of a computer, but address results of a system that is a direct consequence of software used as a service such as communication services.

FIG. 1 includes an example flow of an email followed by a recall email to illustrate a conventional mechanism of taking back a sent email.

As illustrated in diagram 100, an email 10 may be generated by a sender 102 and sent to a recipient 114. The email may pass through a transmitting server 110 and a receiving server 112 (in scenarios, where two distinct systems are involved). In other scenarios, the transmitting server 110 and the receiving server 112 may be the same server. The email 104 may include textual content, as well as, images, graphics, embedded objects, etc.

If the sender 102 determines they did not want to send the email or at least part of it after having sent the email, conventional mechanisms allow transmission of a recall email 106. In a typical scenario, the recall email 106 may arrive after the email 104, and the original email 104 would only be "recalled" or removed from the recipient's inbox if the recipient 114 opens or activates the recall email 106 first. In some cases, where the sender and the recipient may be in distinct systems, the recall mechanism may not work at all. Moreover, the recall mechanism is limited to the entire email and not portions of its content.

Figure 2:
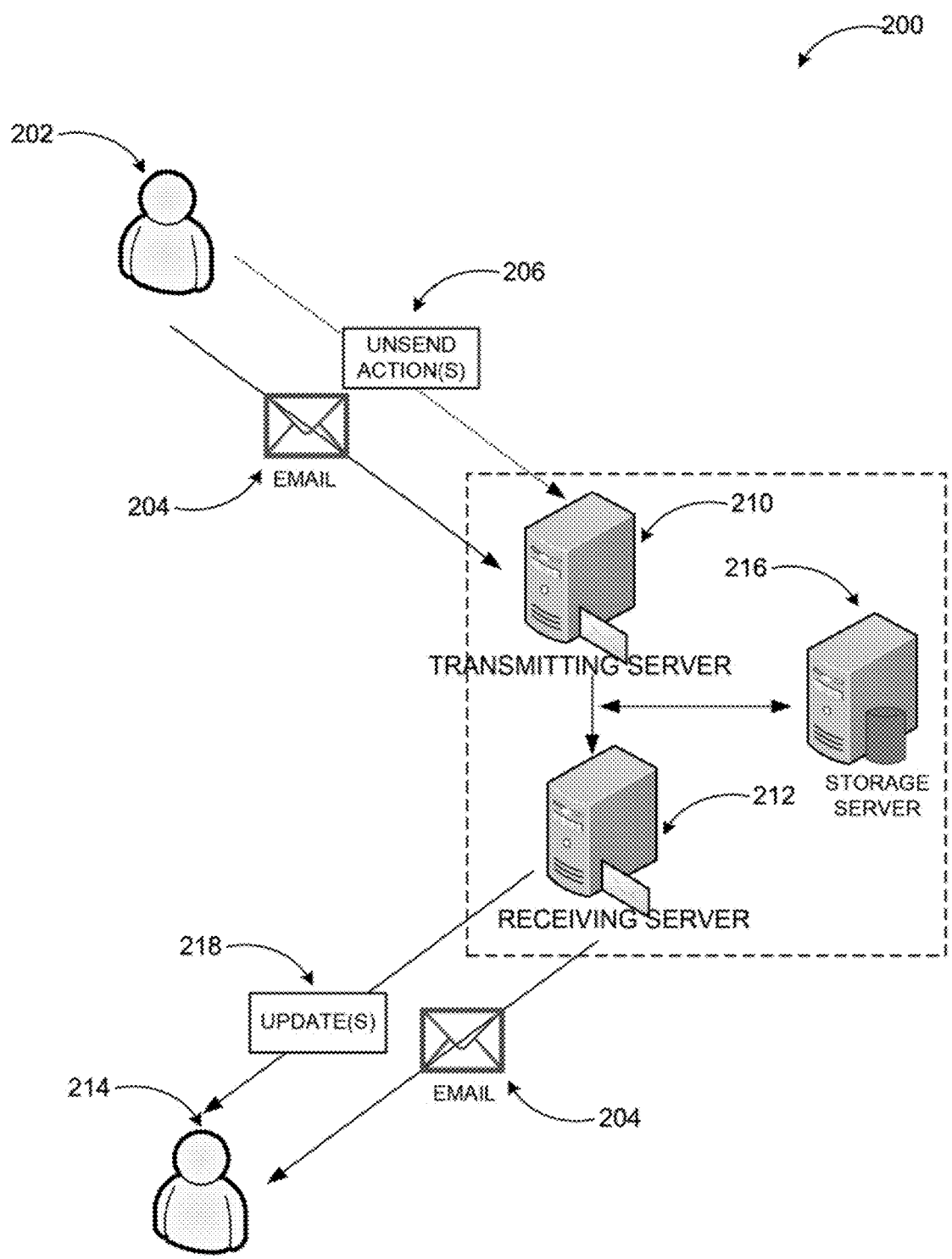
FIG. 2 includes an example flow of an email followed by an unsend action to illustrate a mechanism to modify a sent email in a system according to embodiments.

FIG. 2 includes an example flow of an email followed by an unsend action to illustrate a mechanism to modify a sent email in a system according to embodiments.

Diagram 200 illustrates an email 204 sent by sender 202 to recipient 214 via transmitting server 210 and receiving server 212. Content such as textual data, images, graphics, video or audio content, or similar data may be included with the email, where the content may be embedded into or attached as a separate entity to the email, inserted into a body of the email, or provided along with the email as a link to the content.

In a system according to embodiments, the content within the email may be stored at a storage server 216 and links to the stored content may be provided to the recipient 214. When the recipient 214 opens the email, the stored content may be retrieved from the storage server 216 and rendered. Links may be provided to individual portions of content (e.g., individual images, textual data, graphics, etc.), which may be stored separately, or all of the content may be stored as one entity with a single link provided to the recipient 214. With this infrastructure, sender 202 may be enabled to retract the entire email or portions of the content by sending an instruction to the storage server 216 in form of an "unsend" action 206. The unsend action 206 may remove the content (or the entire email) from the storage server 216, thus the email or portions of its content may disappear from the recipient's inbox even after the recipient has seen it. In other embodiments, the sender 202 may modify the email or its content by modifying them at the storage server 216 (through unsend action 206 or another action) and the recipient 214 would see the modified version.

Following rendering of the email at the recipient's communication application, which may be a thick or thin client, chances or recalls of the email or its content may be applied on the recipient side through a push action, a synchronization action, or a notification to the recipient's communication application that content has changed/been removed, and the communication application may retrieve the latest version. This may enable recipients to see the latest version of delivered content allowing live content to be sent through regular email mechanism.

Transmitting server 210, receiving server 212, and storage server 216 may be implemented as single or multiple physical servers and associated special purpose devices. They may be part of distinct systems, or a single system. They may even be implemented as a single server. Other components, such as various forms of data storage devices, communication exchange devices, and similar ones may also be used in the system.

FIG. 3A through 3D illustrate example sender and recipient emails with unsend actions and a conceptual diagram of how modifications can be performed in different scenarios.

Figure 3A:
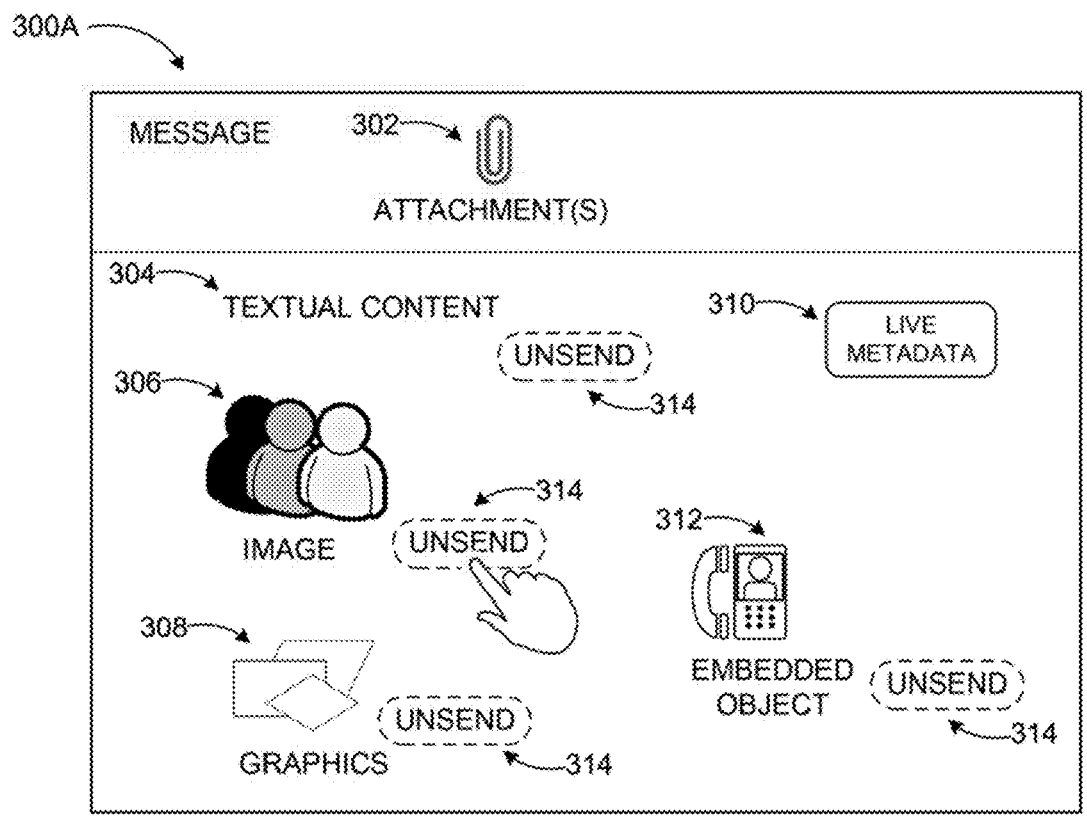

FIG. 3A shows an example email message 300A that may include one or more attachments 303, textual content 304, one or more images 306, one or more graphics 308, an embedded object 312, and live metadata 310. The portions of content shown in the email message 300A are examples for illustrative purpose only. Embodiments may be applied to other forms of content using the principles discussed herein.

In some embodiments, each piece of content within the email message may be associated with an unsend control element 314 to enable the sender recall the respective portion of content or modify it. The unsend control elements may be presented in any suitable form such as buttons, check boxes, links, or comparable control elements. The amend control elements may also be displayed in a persistent manner in proximity to each portion of control or displayed upon detecting user interest on a content portion (e.g., hovering action). Furthermore, the term "unsend" is used as an illustrative example. Other terms may be used for the same control element or action. Moreover, different control elements may be used to recall a portion of content or to modify the portion of content.

Figure 3B:
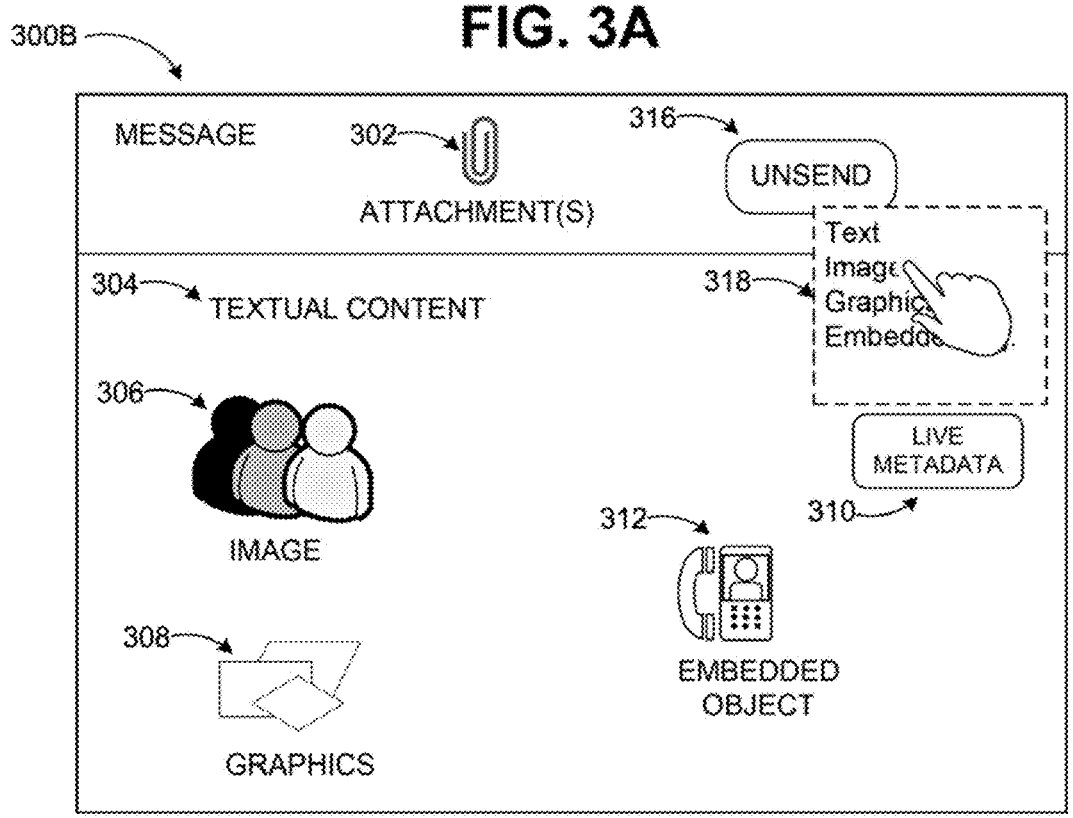

FIG. 3B shows email message 300B with similar content to the email message 300A. An alternative method of enabling a sender to recall or modify portions of content in a delivered email is to provide a single control element 316, which if activated may present a list 318 of content portions that can be modified or recalled and allow the sender to select among them. In yet other embodiments, unsend control elements may be presented for groups of content portions.

Figure 3C:
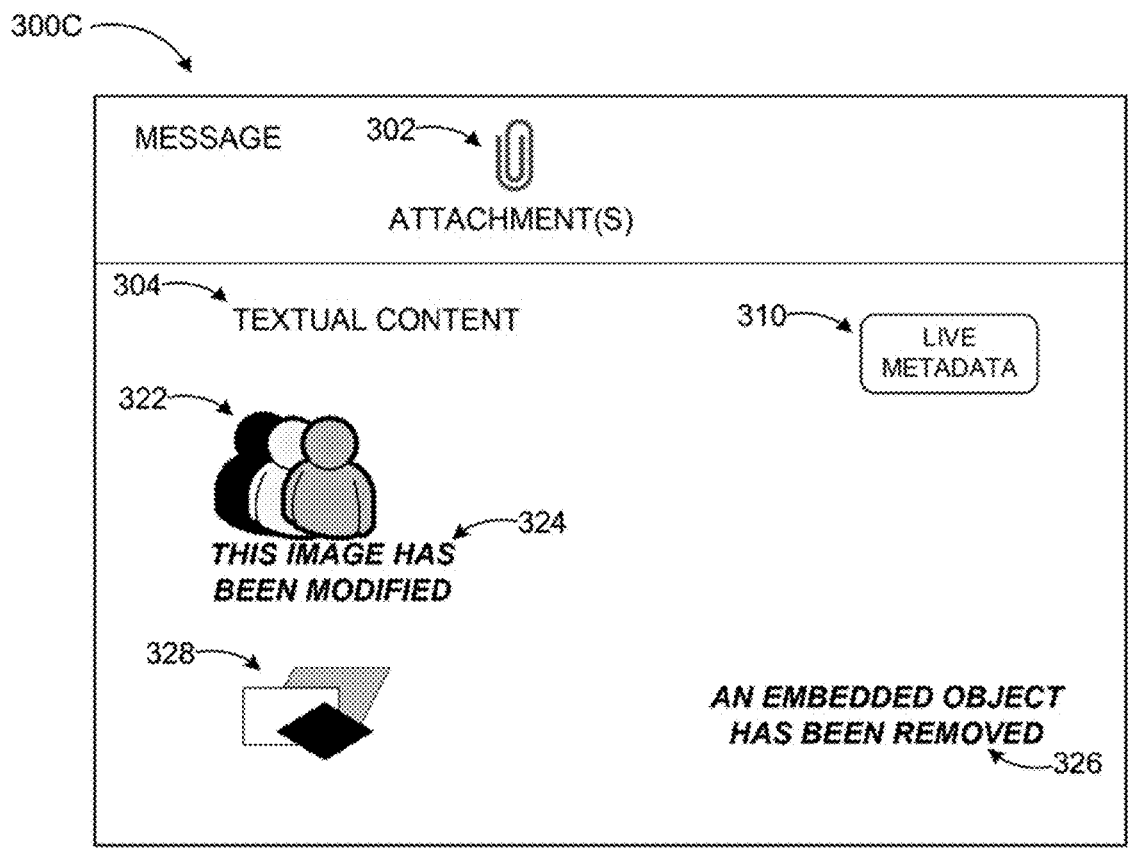

FIG. 3C shows an email message 300C as seen by its recipient. The email message 300C may include content portions similar to the content portions of email messages 300A or 300B, but some of the content portions may be modified after the message has been sent. In the example email message 300C, different examples of how modifications or recalls may be presented to the recipient are shown. In one example, modification of content may be indicated in proximity to the modified content as shown with the textual message 324 next to the images 322, which have been modified by the sender. In other embodiments, the indication may be in a graphical or similar form. Similarly, removal of a portion of content such as the embedded content 312 of email message 300A may be indicated with statement 326 or a graphical indicator. In yet other embodiments, no indication may be provided as in the example of modified graphics 328.

While the recipient may see the latest version of the message with the content modified or removed per the sender, the sender may be enabled to see one or more versions of the sent email with the various changes. Thus, the sender may see a progression of changes in the sent email (if there are more than one).

Diagram 300D in FIG. 3D show conceptually various delivery mechanisms for the unsend actions. Once the sent message 352 is delivered from the sender to the recipient as received message 354, the sender may recall or make changes to the sent message on their end. These changes may be provided to the storage server 356 through a push action (upon completion of the change) or through a periodic synchronization. The storage server 356 may then provide the changes to the recipient through a push action, periodic synchronization, or through a change notification. In the latter case, the recipient's client may be configured to synchronize automatically with the storage server 356 upon receiving a notification that one or more of the portions of content in the received message 354 has been changed.

In further embodiments, a time-based update feature may be enabled. In an example scenario, the message may include content that may be modified over time at its source. The source may be the storage server 356 or a different data storage 362. For example, the message may include a spreadsheet, whose source data may change at a database as new data is collected. Then, periodically (e.g., once a day), the received message 354 may be synchronized with the storage server 356 and thereby with the source database allowing the recipient to see the latest data in the spreadsheet without having to manually update the spreadsheet. Similarly, other types of live metadata may be provided and updated in delivered messages.

The examples provided in FIGS. 1 through 3D are illustrated with specific services, devices, applications, modules, module components, and configurations. Embodiments are not limited, to environments according to these examples. Modification of delivered message content may be implemented in environments employing fewer or additional services, devices, applications, modules, module components, and configurations. Furthermore, the example services, devices, applications, modules, module components, and configurations shown in FIG. 1 through 3 may be implemented in a similar manner with other values using the principles described herein.

Figure 4:
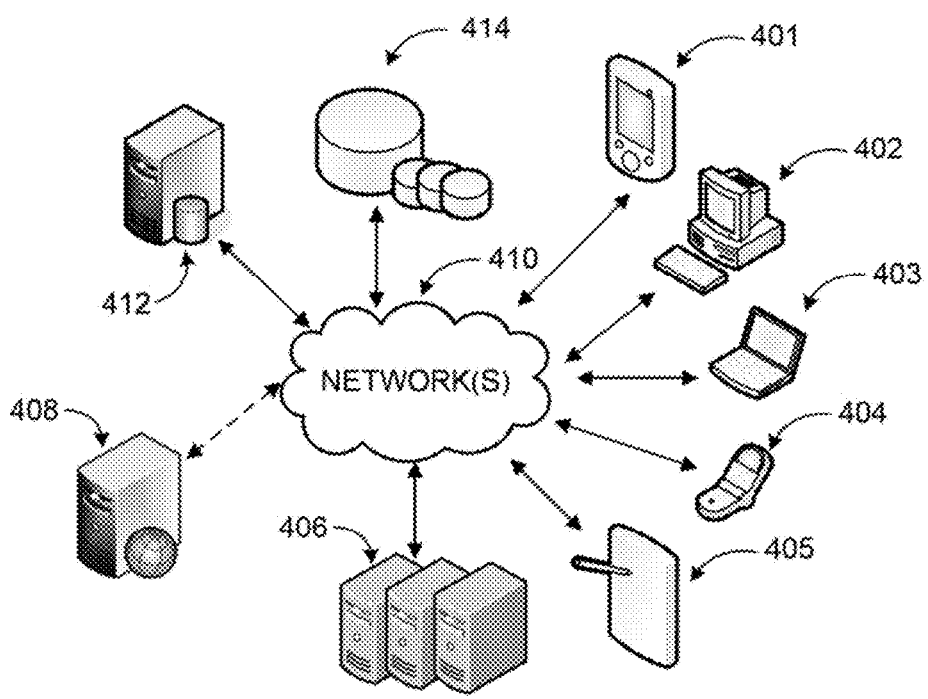
FIG. 4 is a networked environment, where a system according to embodiments may be implemented.

FIG. 4 is a networked environment, where a system according to embodiments may be implemented. As shown in a diagram 400, emails or similar communication may be delivered to recipients and content removed or modified after delivery through the use of links and storage of content in a storage server instead of being statically delivered with each message. An example communication application or service with modification after delivery capability may be implemented via software executed over one or more servers 406 or individual server 408. The communication application or service may communicate with client applications on individual computing devices such as a handheld computer 401, a desktop computer 402, a laptop computer 403, a smart phone 404, a tablet computer (or slate), 405 ('client devices') through network(s) 410 and control exchange of communications such as emails.

Client devices 401-405 are used to access the functionality provided by the communication service or application. One or more of the servers 406 or server 408 may be used to provide a variety of services associated with processing rich attachments as discussed above. Relevant data may be stored in one or more data stores (e.g. data store 414), which may be managed by any one of the servers 406 or by database server 412.

Network(s) 410 may comprise any topology of servers, clients, Internet service providers, and communication media. A system according to embodiments may have a static or dynamic topology. Network(s) 410 may include a secure network such as an enterprise network, an unsecure network such as a wireless open network, or the Internet. Network(s) 410 may also coordinate communication over other networks such as PSTN or cellular networks. Network(s) 410 provides communication between the nodes described herein. By way of example, and not limitation, network(s) 410 may include wireless media such as acoustic, RF, infrared and other wireless media.

Many other configurations of computing devices, applications, data sources, and data distribution systems may be employed to provide modification of email content after delivery. Furthermore, the networked environments discussed in FIG. 4 are for illustration purposes only. Embodiments are not limited to the example applications, modules, or processes.

Figure 5:
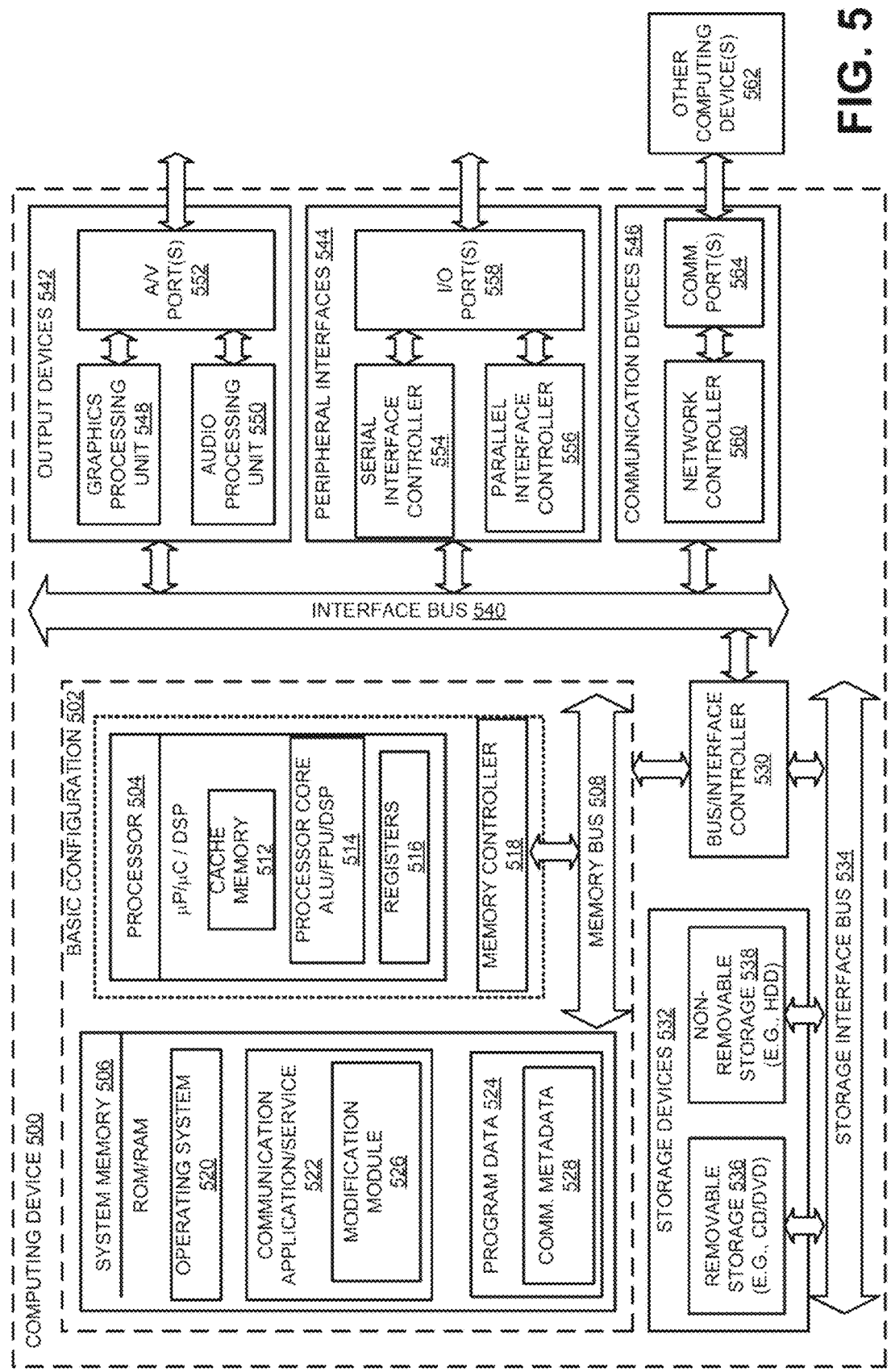
FIG. 5 is a block diagram of an example general purpose computing device, which may be used to provide modification of delivered email content.

FIG. 5 and the associated discussion are intended to provide a brief, general description of a general purpose computing device, which may be used to provide modification of delivered email content.

For example, computing device 500 may be used as a server, desktop computer, portable computer, smart phone, special purpose computer, or similar device. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), as microcontroller (µC), at digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a communication application/service 522, a modification module 526, and program data 524. The program data 524 may include, among other data, communication metadata 528, as disclosed herein. The modification module 526 may, in conjunction with the communication application/service 522, enable storage of email content in a storage server and delivery of sent emails with links to their content. Following delivery, senders may be enabled to remove or modify portions of entire content of delivered emails by submitting unsend actions to the storage server, which may update the delivered emails through push or synchronization actions.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 54 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which ma be arranged to facilitate communications with one or more other computing devices 562 over a network communication link via one or more communication ports 564. The one or more other computing devices 562 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to provide modification of delivered email content. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
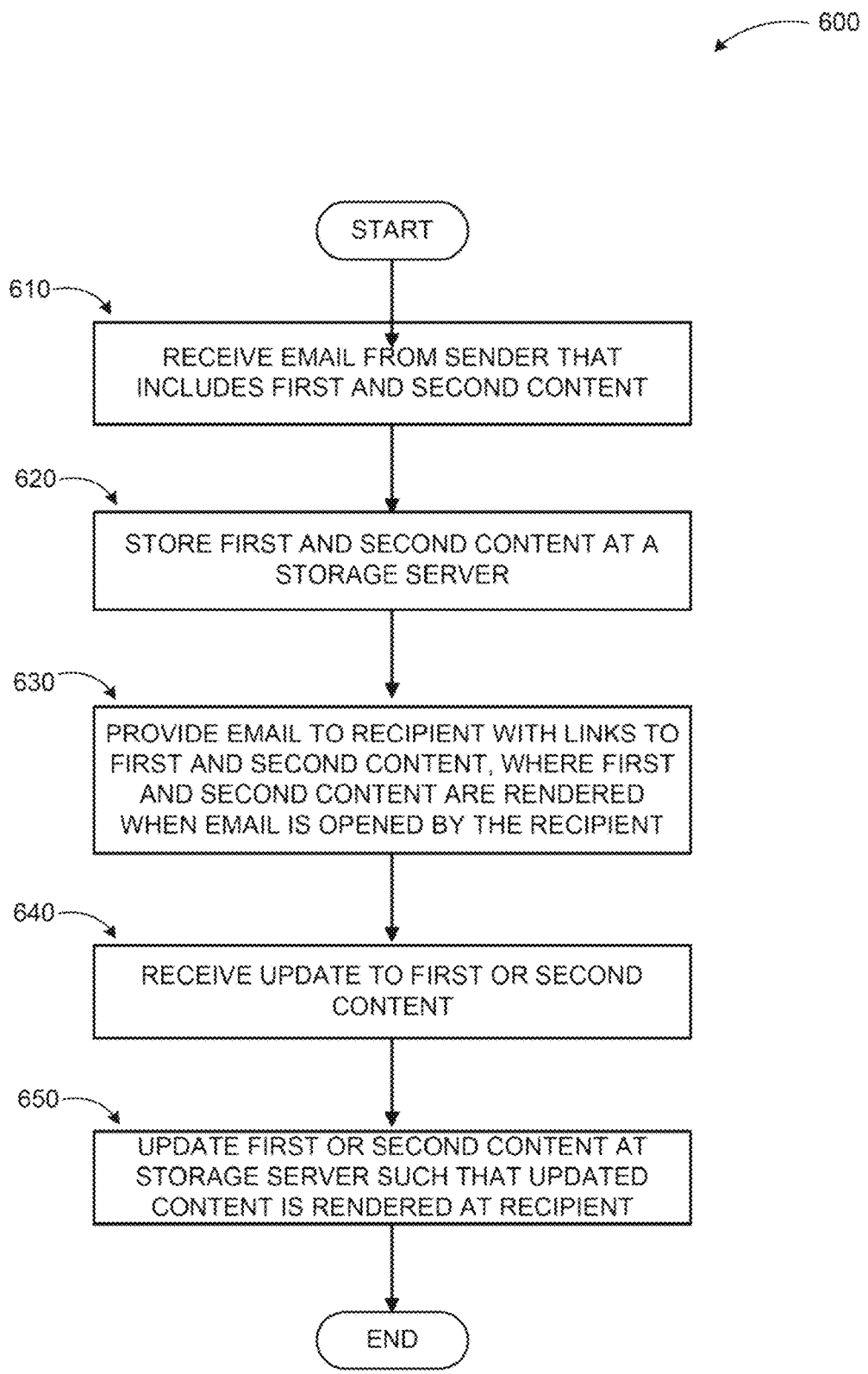
FIG. 6 illustrates a logic flow diagram or as method to provide modification of delivered email content, according to embodiments.

FIG. 6 illustrates a logic flow diagram for process 600 of a method to provide modification of delivered email content, according to embodiments. Process 600 may be implemented on a server or other system. An example system may include a communication service that manages various communication modes such as emails. The system may be capable of modifying content of delivered emails as described herein.

Process 600 begins with operation 610, where an email may be received from a sender and include different portions of content such as textual data, images, graphics, embedded objects, live metadata, and so on. At operation 620, the portions of content in the email may be stored as a storage server and links to the stored portions of content may replace the portions of content in the email that is delivered to the recipient at operation 630. The stored portions of content may be actually delivered upon the recipient opening the email by automatic activation of the links and rendered to the recipient. Thus, until the recipient opens the email, the stored portions of the content may be removed or modified by the sender by sending instructions to the storage server.

At operation 640, an update may be received to one or more of the portions of content from the server and the updates may be applied to the affected portions of content at operation 650 such that the updated portions of content are rendered to the recipient through a push or synchronization action.

The operations included in process 600 are for illustration purposes. Rich attachment regeneration may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing modification of sent email content may include a means for receiving an email from a sender with a first content and a second content; storing the first content and the second content at a storage server; a means for replacing the first content and the second content in the email with a first link and a second link; a means for providing the email to a recipient with the first link and the second link, where the first content and the second content are delivered automatically upon opening of the email by the recipient; a means for receiving an update to one of the first content and the second content from the sender; and a means for updating the one of the first content and the second content at the storage server such that the updated one of the first content and the second content is rendered to the recipient.

According to some examples, a computing device to provide modification of sent communications is described. The computing device may include a memory configured to store instructions and one or more processors coupled to the memory, the one or more processors configured to execute, in conjunction with the instructions stored in the memory, a communication service. The communication service may include a communication exchange module configured to facilitate exchange of a communication between a sender and one or more recipients and a modification module. The modification module may be configured to receive the communication from the sender with a first content and a second content; store the first content and the second content at a storage server; replace the first content and the second content in the communication with as first link and a second link; provide the communication to a recipient with the first link and the second link, wherein the first content and the second content are delivered automatically upon opening of the communication by the recipient; receive an update to one of the first content and the second content from the sender; and update the one of the first content and the second content at the storage server such that the updated one of the first content and the second content is rendered to the recipient.

According to other examples, the first content and the second content may be part of a body of the communication, embedded into the communication, or attached as a separate file to the communication. The link may be a hypertext markup language "HTML" link. The modification module may be further configured to receive the update to the one of the first content and the second content through one of a push mechanism from a client application of the sender and a synchronization mechanism between the client application of the sender and the communication service. The modification module may be further configured to provide the update to the one of the first content and the second content through one of a push mechanism from the communication service to a client application of the recipient, transmission of a change notification to the client application of the recipient, and a synchronization mechanism between the client application of the recipient and the communication service.

According to further examples, the first content and the second content may include one or more of textual data, images, graphics, a video object, an audio object, a file, and unstructured data. The computing device may be a transmitting server of the communication service associated with the sender and the modification module may be further configured to provide the communication with the first link and the second link to a receiving server of another communication service associated with the recipient. The update to the one of the first content and the second content may be removal or modification of the one of the first content and the second content.

According to yet other examples, the modification module may be further configured to enable the sender to view a change history of the communication. The change history may include one or more versions of the communication with each version including one modification. The modification module may be configured to update the one of the first content and the second content at the storage server such that the updated one of the first content and the second content is rendered to the recipient prior to the recipient opening the communication. The communication may be an email, an instant message an online conference recording, a data sharing session, or an application sharing session.

According to other examples, a method executed on a computing device to provide modification of sent email content may include receiving an email from a sender with a first content and a second content; storing the first content and the second content at a storage server; replacing the first content and the second content in the email with a first link and a second link; providing the email to a recipient with the first link and the second link, where the first content and the second content are delivered automatically upon opening of the email by the recipient; receiving an update to one of the first content and the second content from the sender; and updating the one of the first content and the second content at the storage server such that the updated one of the first content and the second content is rendered to the recipient.

According to further examples, the method may also include displaying a first "unsend" control element and a second "unsend" control element in proximity to the first content and the second content, respectively in order to enable the sender to modify the one of the first content and the second content. The first "unsend" control element and the second "unsend" control element may be displayed in one of a persistent manner and upon detection of sender interest in the one of the first content and the second content.

According to some examples, the method may further include displaying an "unsend" control element on the email in order to enable the sender to modify one or more of the email, the first content, and the second content. The method may further include displaying a selection element upon detecting an activation of the "unsend" control element on the email in order to enable the sender to select one or more of the email, the first content, and the second content to be modified. The method may also include enabling the sender to insert a third content into the email, where the third content is associated with dynamic data stored at a data source and the third content is updated periodically from the data source after the email is delivered to the recipient.

According to further examples, a computer readable memory device with instructions stored thereon to provide modification of sent emails is described. The instructions may include receiving an email from a sender with a first content and a second content; storing the first content and the second content at a storage server; replacing the first content and the second content in the email with a first link and a second link; providing the email to a recipient with the first link and the second link, where the first content and the second content are delivered automatically upon opening of the email by the recipient; displaying an "unsend" control element to the sender in order to enable the sender to one of remove and modify one of the first content and the second content; receiving an update to the one of the first content and the second content from the sender; and updating the one of the first content and the second content at the storage server such that the updated one of the first content and the second content is rendered to the recipient.

According to other examples, the instructions may further comprise providing one or more indications to the recipient associated with updates to the one of the first content and the second content on the received email after the one of the first content and the second content are updated.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide modification of sent communication, the computing device comprising:
   a memory configured to store instructions; and
   one or more processors coupled to the memory, the one or more processors configured, in conjunction with execution of the instructions stored in the memory, to:
   receive a communication from a sender with a first content and a second content, the first content and the second content each being a portion of a body of the communication;
   store the first content and the second content at a storage server;
   replace the first content in the communication with a first link and replace the second content in the communication with a second link;
   provide the communication to a recipient with the first link and the second link;
   deliver the first content and the second content automatically upon opening of the communication by the recipient;
   provide a user interface to the sender displaying the communication, the user interface including a first unsend control element associated with the first content and a second unsend control element associated with the second content; and
   in response to receiving a selection of the first unsend control element associated with the first content after delivering the first content and upon the opening of the communication by the recipient;
   automatically update the communication as delivered to the recipient to remove the first content and the first link associated with the first content and add a notification, wherein the notification comprising a textual message that indicates the first content has been removed by the sender from the communication after the first content was delivered to the recipient.

2. The computing device of claim 1, wherein the link is a hypertext markup language "HTML" link.

3. The computing device of claim 1, wherein the one or more processors are further configured to receive the update to the first content through one of a push mechanism from a client application of the sender and a synchronization mechanism between the client application of the sender and the communication service.

4. The computing device of claim 1, wherein the one or more processors are further configured to provide the update to the first content through one of a push mechanism from the communication service to a client application of the recipient, transmission of a change notification to the client application of the recipient, and a synchronization mechanism between the client application of the recipient and the communication service.

5. The computing device of claim 1, wherein the content includes one or more of textual data, images, graphics, a video object, an audio object, a file, or unstructured data.

6. The computing device of claim 1, wherein the computing device is a transmitting server of the communication service associated with the sender and the one or more processors are further configured to provide the communication with the first link and the second link to a receiving server of another communication service associated with the recipient.

7. The computing device of claim 1, wherein the one or more processors are further configured to update the second content at the storage server such that the updated second content is rendered to the recipient prior to the recipient opening the communication.

8. The computing device of claim 1, wherein the communication is one of an email, an instant message, an online conference recording, a data sharing session, and an application sharing session.

9. A method executed on a computing device to provide modification of sent email, the method comprising:
- receiving the email from a sender with a first content and a second content, the first and second content each being a portion of a body of the email;
- storing the first content and the second content at a storage server;
- replacing the first content in the body of the email with a first link and replacing the second content in the body of the email with a second link;
- providing the email to a recipient with the first link and the second link;
- delivering the first content and the second content automatically upon opening of the email by the recipient;
- providing a user interface to the sender displaying the email, the user interface including a first unsend control element associated with the first content and a second unsend control element associated with the second content; and
- in response to receiving a selection of the first unsend control element associated with the first content after delivering the first content and upon the opening of the email by the recipient;
- automatically updating the email as delivered to the recipient to remove the first content and the first link associated with the first content and add a notification, wherein the notification comprising a textual message that indicates the first content has been removed by the sender from the communication after the first content was delivered to the recipient.

10. The method of claim 9, wherein the first unsend control element is displayed in one of a persistent manner and upon detection of sender interest in the first content.

11. The method of claim 9, wherein the first unsend control element and the second unsend control element are displayed in response to selection of a third unsend control element included in the user interface.

12. The method of claim 9, further comprising enabling the sender to insert a third content into the body of the email, wherein the third content is associated with dynamic data stored at a data source and the second content is updated periodically from the data source after the email is delivered to the recipient.

13. A computer readable memory device with instructions stored thereon to provide modification of sent email, the instructions comprising:
- receiving an email from a sender with a first content and a second content, the first and the second content each being a portion of a body of the email;
- storing the first content and the second content at a storage server;
- replacing the first content in the email with a first link and replacing the second content in the email with a second link;
- providing the email to a recipient with the first link and the second link;
- delivering the first content and the second content automatically upon opening of the email by the recipient;
- providing a user interface to the sender displaying the email, the user interface including a first unsend control element associated with the first content and a second unsend control element; and
- in response to receiving a selection of the first unsend control element associated with the first content after delivering the first content and upon the opening of the communication by the recipient;
- automatically updating providing the email as delivered to the recipient to remove the first content and the first link associated with the first content and adding a notification, wherein the notification comprising a textual message that indicates the first content has been removed by the sender from the email after the first content was delivered to the recipient.

14. The computing device of claim 1, wherein a type of content included in the first content is different from a type of content included in the second content.

* * * * *